US012194484B2

(12) United States Patent
Russo et al.

(10) Patent No.: US 12,194,484 B2
(45) Date of Patent: Jan. 14, 2025

(54) PLASMA NOZZLE FOR A THERMAL SPRAY GUN AND METHOD OF MAKING AND UTILIZING THE SAME

(71) Applicant: OERLIKON METCO AG, WOHLEN, Wohlen (CH)

(72) Inventors: Dario Russo, Kilchberg (CH); Richard Karl Schmid, Gerlikon (CH); Alexander Barth, Constance (DE); Malko Gindrat, Wohlen (CH)

(73) Assignee: OERLIKON METCO AG, WOHLEN, Wohlen (CH)

( * ) Notice: Subject to any disclaimer, the term of this patent is extended or adjusted under 35 U.S.C. 154(b) by 1057 days.

(21) Appl. No.: 16/971,989

(22) PCT Filed: Feb. 27, 2019

(86) PCT No.: PCT/EP2019/054824
§ 371 (c)(1),
(2) Date: Aug. 21, 2020

(87) PCT Pub. No.: WO2019/166473
PCT Pub. Date: Sep. 6, 2019

(65) Prior Publication Data

US 2020/0391239 A1 Dec. 17, 2020

Related U.S. Application Data

(60) Provisional application No. 62/635,735, filed on Feb. 27, 2018.

(51) Int. Cl.
*B05B 12/18* (2018.01)
*B05B 7/14* (2006.01)
(Continued)

(52) U.S. Cl.
CPC ............ *B05B 12/18* (2018.02); *B05B 7/1481* (2013.01); *C23C 4/134* (2016.01); *H05H 1/36* (2013.01); *H05H 1/42* (2013.01)

(58) Field of Classification Search
CPC ........ B05B 12/18; B05B 7/1481; H05H 1/42; H05H 1/36; C23C 4/134
See application file for complete search history.

(56) References Cited

U.S. PATENT DOCUMENTS 4,948,485 A 8/1990 Wallsten et al.
5,243,169 A * 9/1993 Tateno ..................... H05H 1/44 219/121.48

(Continued)

FOREIGN PATENT DOCUMENTS

CN 1319459 10/2001
CN 103132072 6/2013

(Continued)

OTHER PUBLICATIONS

China Search Report/Office Action conducted in China Appln. No. 2019800131579 (Sep. 5, 2022).

(Continued)

*Primary Examiner* — Jason J Boeckmann
(74) *Attorney, Agent, or Firm* — GREENBLUM & BERNSTEIN, P.L.C.

(57) ABSTRACT

Plasma nozzle includes a nozzle body arranged to engage with a thermal spray gun. The nozzle body includes an axial through bore having up-stream input orifice and a down-stream nozzle exit, at least one material injector positioned between the up-stream input orifice and the nozzle-exit, said at least one material injector being configured to introduce a feedstock material into a gas flow passing through the axial through bore and at least one gas injector configured to introduce a shroud gas flow into the axial through bore and
(Continued)

being located at a position up-stream of said at least one material injector.

23 Claims, 8 Drawing Sheets

(51) Int. Cl.

| | |
|---|---|
| ***C23C 4/134*** | (2016.01) |
| ***H05H 1/36*** | (2006.01) |
| ***H05H 1/42*** | (2006.01) |

(56) References Cited

U.S. PATENT DOCUMENTS

| | | | |
|---|---|---|---|
| 5,285,967 | A | 2/1994 | Weidman |
| 5,573,682 | A | 11/1996 | Beason, Jr. et al. |
| 6,322,856 | B1 | 11/2001 | Hislop |
| 8,986,792 | B2 | 3/2015 | Hospach et al. |
| 2008/0308538 | A1 | 12/2008 | Harris et al. |
| 2014/0144888 | A1 | 5/2014 | Toyota |
| 2016/0207113 | A1 | 7/2016 | Nagai et al. |

FOREIGN PATENT DOCUMENTS

| | | |
|---|---|---|
| EP | 0 250 308 | 12/1987 |
| EP | 2 439 306 | 4/2012 |
| EP | 2 676 735 | 12/2013 |
| GB | 869 791 | 6/1961 |
| JP | 2010-149095 | 7/2010 |
| JP | 2014-172057 | 9/2014 |
| WO | 90/05612 | 5/1990 |

OTHER PUBLICATIONS

S. Matthews , "Shrouded plasma spray of Ni—20Cr coatings utilizing internal shroud film cooling", (https://www.sciencedirect.com/science/article/pii/S0257897214002679) (2014) pp. 56-74.

S. Yoon et al., "Tribological behavior of B4C reinforced Fe-base bulk metallic glass composite coating", (https://www.sciencedirect.com/science/article/pii/S0257897210007279) (2010) pp. 1962-1968.

J. Li et al., "Effect of vapor deposition in shrouded plasma spraying on morphology, and wettability of the metallic Ni20Cr coating surface", (https://www.sciencedirect.com/science/article/pii/S0925838817338926) (2018) pp. 430-440.

Int'l Search Report (Form PCT/ISA/210) in Int'l Appln. No. PCT/EP2019/054824 (May 29, 2019).

Int'l Written Opinion (Form PCT/ISA/237) in Int'l Appln. No. PCT/EP2019/054824 (May 29, 2019).

* cited by examiner

PLASMA NOZZLE FOR A THERMAL SPRAY GUN AND METHOD OF MAKING AND UTILIZING THE SAME

CROSS-REFERENCE TO RELATED APPLICATIONS

The instant application claims priority under 35 U.S.C. § 119(e) of U.S. provisional Patent Application No. 62/635,735 filed on Feb. 27, 2018. The disclosure of which is expressly incorporated by reference herein in its entirety.

STATEMENT REGARDING SPONSORED RESEARCH OR DEVELOPMENT

Not Applicable.

BACKGROUND OF THE INVENTION

Field of the Invention

The invention relates to a plasma nozzle having a nozzle body arranged to engage with a thermal spray gun, with the nozzle body having an axial through bore with up-stream input orifice and a down-stream nozzle exit. The nozzle body also has one or more material injector openings positioned between the input orifice and the nozzle-exit for providing a feedstock material as well as one or more gas injector openings for providing a shroud gas flow. In embodiments, the gas injector opening(s) is positioned up-stream relative to the material injector opening(s). A method of making and using the same is also disclosed.

Description of Related Art

Thermal spray coating materials are known and are typically metallic and/or ceramic powder materials. Some of these powder materials offer wear, corrosion resistance as well as acting as thermal barrier coatings when used to form thermal spray coatings.

Plasma spray is a widely used process to deposit a large range of such coating materials. The material is supplied as powder, suspension, solution or liquid and injected into a stream of hot, highly ionized gas. The material thus melts or vaporizes in this hot plasma and is at the same time accelerated towards the substrate by the plasma stream. In case of vacuum plasma spraying, in which the spray equipment is operated inside a vessel at low ambient pressure, the injection takes place inside the anode/nozzle of the plasma generator. This layout is referred to as internal injection.

FIG. 1 shows a schematic of a prior art plasma spray gun having internal injection. With respect to the gas flow direction, upstream US refers to the direction towards the injection of the plasma gas GF around the cathode CA and downstream DS refers to the direction towards the anode/nozzle exit which in this example is located on a downstream end of the anode An. In this device, the plasma arc A is formed by applying a voltage from a powder supply PS between the cathode CA and the anode An which is at the same time guiding the gas stream GF. The arc A moves in a direction of an anode axis and over the whole circumference in an arbitrary motion but is kept upstream from the injection point PI of the powder or suspension. The powder injection port P is used to introduce powder in the form of powder particles PP into a plasma jet PJ. The nozzle includes coolant flows CW which function allow cooling water to cool the nozzle. This is described in U.S. Pat. No. 6,322,856 to HISLOP whose disclosure is herein expressly incorporated by reference in its entirety. The process occurs at low ambient pressure and is called Low Pressure Plasma Spraying (LPPS) or Vacuum Plasma Spraying (VPS). Under certain conditions described in EP Patent 2 439 306, whose disclosure is herein expressly incorporated by reference in its entirety, the material is transferred partially or completely into the vapor phase. This process regime is referred to as plasma spray physical vapor deposition (PS-PVD).

Internal injection is also used in suspension plasma spraying (SPS) or solution precursor plasma spraying (SPPS). These two processes can be operated in atmosphere (atmospheric pressure) as well as under controlled atmosphere at pressures down to those described in e.g., U.S. Pat. No. 8,986,792 to HOSPACH et al.

The internal injection allows for a more efficient transfer of thermal energy from the plasma to the injected material. This is of special importance in processes in which the injected powder material (or the particles in suspension) are brought into the vapor phase or broken up into nano-sized clusters or a solvent has to be removed. Without the confinement of the plasma-material mix, the heat transfer would be insufficient and lead to a low process efficiency and inferior coating properties.

These LPPS/VPS/PS-PVD and SPS/SPPS processes are in commercial use to apply mainly MCrAlY-alloys, thermal barrier coatings made from ceramic materials or dense ceramic layers. See, for example, Handbook of Thermal Spray Technology whose disclosure is herein expressly incorporated by reference in its entirety.

Since the anode in such devices is typically water cooled, there is the chance of re-condensation or solidification of material on the anode wall at a location downstream from point of the material injection as well as around the injection port. The deposited material can lead to impairment of or complete disruption of the coating process. The phenomena of material adhering to the anode wall (and the exit of the feedstock injector) is called clogging. The most critical issues resulting from clogging are a) deflection of the plasma jet, b) the embedding of material that detaches from the anode and finds its way into the coating (see Handbook of Thermal Spray Technology) and c) plugging the injection port completely.

Several prior art devices function via the formation of a shroud while spraying in atmosphere around the plasma gas stream outside the anode (See Article entitled Shrouded plasma spray of Ni-20Cr coatings utilizing internal shroud film cooling by S. Matthews (https://www.sciencedirect.com/science/article/pii/S0257897214002679), Article entitled Tribological behavior of $B_4C$ reinforced Fe-base bulk metallic glass composite coating by S. Yoon et al. (https://www.sciencedirect.com/science/article/pii/S0257897210007279), Article entitled Effect of vapor deposition in shrouded plasma spraying on morphology, and wettability of the metallic Ni20Cr coating surface by J. Li et al. (https://www.sciencedirect.com/science/article/pii/S0925838817338926) and EP 2 439 306, whose disclosures are herein expressly incorporated by reference in their entireties), or in flame spraying (see U.S. Pat. No. 5,285,967 to WEIDMAN, whose disclosure is herein expressly incorporated by reference in its entirety) around the flame to protect the injected material from the surroundings, in particular, oxidation in case of alloys, or burning in case of plastics. In all those processes the gas is injected in an extension mounted onto the spray gun and thereby takes place only downstream from the injection point of the material and outside of the spray gun and in case of plasma processes outside the anode. FIG. 2 schematically shows an example of a conventional plasma gun PG using a shroud gas flow forming an internal shroud gas film ISGF along the inner wall of the shroud SH. The device uses powder injection PJ and shroud gas injection ISI in combination with powder trajectory PT to transform powder particles P into a coating material.

For most thermal spray processes, in particular, plasma spray processes, the radial feedstock injection is placed outside the spray gun to avoid material build-up on the nozzle and exit of the spray gun, but this arrangement can be improved. For powder based spray vacuum processes at working pressures below 100 mbar, and especially below 5 mbar, the spray plume expands radially once it leaves the confining anode which makes an external injection unpractical. In case of suspension based or solution based spray processes, a large share of the transferred energy is absorbed to mainly evaporate the solvent. As a consequence, in order to have a more efficient process to melt the feedstock material, the injection of material is done inside the anode. At this location the plasma is denser and slower due to the confinement from the anode walls, leading to longer dwell times, and higher heat transfer rates compared to spray systems having an external injection of powder material.

Some plasma spray systems use an axial injection system for the feedstock to allow an internal injection into a denser, hotter plasma. However, this design suffers from two shortcomings. The first is that the injector is exposed to much higher heat fluxes leading to an increased probability of material build-up on the injector itself, either at the exit or also deeper inside the injector. The second is that using certain plasma parameter regimes or compositions of plasma gas, the generated flow from the hot gas or plasma jet is turbulent, leading to material being deposited on the anode wall.

The vacuum type plasma spraying processes require having an internal injection of the material because of the radial expansion of the plasma jet from the jet axis at the nozzle exit. The injection is made radially with respect to the plasma jet, towards the plasma jet and may have directions either upstream or downstream between angles of 45° to 135° with respect to the jet axis. Optionally the injection can also have a radial swirl between 0 and 20°, allowing the powder material to be injected radially but slightly off the center of the axis of the plasma jet.

In suspension type plasma spraying and solution precursor plasma spraying the process is conducted either in atmosphere or under controlled atmosphere at pressures down to a few mbar. In the latter case, the plasma gun and system is placed into a controlled atmosphere chamber where the gas composition and pressure can be set and regulated at given pressures. The typical anode designs used for these applications do not usually include any shroud forming gas inlets. However atmospheric thermal spray processes like atmospheric plasma spraying (APS), flame spraying (FS) or electric arc wire spraying make use of shroud gas generated by extensions, or extension nozzles, placed on the spray devices. They feature shroud gas inlets which are localized downstream from the feedstock material injection in a view to fill the volume around the gas jet containing the coating material with an inert gas like nitrogen, argon or similar to protect the spray material from the surrounding air, in particular oxygen. In this case, the injected shroud gas is employed in such a way that it does not influence the hot gas stream and material flux inside the spray gun.

None of the above-noted prior art disclosures, however, describe using an anode of the type shown herein to provide advantageous benefits.

SUMMARY OF THE INVENTION

Embodiments of the invention encompass a plasma nozzle comprising a nozzle body arranged to engage with a thermal spray gun, wherein the nozzle body comprises an axial through bore having upstream input orifice and a down-stream nozzle exit, at least one material injector positioned between the up-stream input orifice and the nozzle-exit, said at least one material injector being configured to introduce a feedstock material into a gas flow passing through the axial through bore, and at least one gas injector configured to introduce a shroud gas flow into the axial through bore and can be located at a position upstream of said at least one material injector.

The at least one gas injector may be an opening in a wall of the nozzle body and the at least one material injector is an opening in the wall of the nozzle body.

The at least one gas injector may be an opening in a wall of the nozzle body having a diameter or size that is less than a diameter of said at least one material injector.

The at least one gas injector may be a first opening and the at least one material injector is a second opening and wherein the first opening is arranged in a semi-circular area defined by 3 times a diameter of the second opening and whose radius extends from a center axis of the second opening.

The first opening may comprise plural openings spaced from the center axis of the second opening by a same amount.

The first opening may comprise plural openings spaced from the center axis of the second opening by different amounts.

The second opening may comprise plural openings.

The nozzle may further comprise at least one down-stream gas injector positioned down-stream of said at least one material injector.

The at least one down-stream gas injector may comprise plural down-stream gas injectors positioned at an azimuthal angle relative to a center axis of the axial through bore.

The nozzle body may be an anode.

The nozzle body may be an anode of a thermal spray gun.

The invention also encompasses a thermal spray gun comprising a plasma nozzle described above.

The invention also encompasses a thermal spray gun plasma nozzle comprising an anode comprising an axial through bore having up-stream input orifice and a down-stream nozzle exit, at least one material injector opening positioned between the up-stream input orifice and the nozzle-exit, said at least one material injector opening being configured to introduce a feedstock material into a gas flow passing through the axial through bore, and at least one gas injector opening configured to introduce a shroud gas flow into the axial through bore and being located at a position up-stream of said at least one material injector opening, wherein the at least one gas injector opening is smaller in diameter than the at least one material injector opening.

The at least one gas injector opening may be arranged in a semi-circular area defined by 3 times a diameter of the at least one material injector opening and whose radius extends from a center axis of the at least one material injector opening.

The at least one gas injector opening may comprise plural openings spaced from the center axis of the at least one material injector opening.

The at least one gas injector opening may comprise plural openings spaced from the center axis of the at least one material injector opening by different amounts.

The invention also encompasses a thermal spray gun plasma nozzle comprising an anode comprising an axial through bore having up-stream input orifice and a down-stream nozzle exit, at least one material injector opening positioned between the up-stream input orifice and the nozzle-exit, said at least one material injector opening being configured to introduce a powder feedstock material into a gas flow passing through the axial through bore and at least one gas injector opening configured to introduce an inert shroud gas flow into the axial through bore and being located at a position up-stream of said at least one material injector opening, wherein the at least one gas injector opening is smaller in diameter or size than the at least one material injector opening.

The at least one gas injector opening may be arranged in a semi-circular or arc-shaped area defined by 3 times a diameter or size of the at least one material injector opening and whose radius extends from a center axis of the at least one material injector opening.

The at least one gas injector opening may comprise plural openings spaced from the center axis of the at least one material injector opening.

The at least one gas injector opening may comprise plural openings spaced from the center axis of the at least one material injector opening by different amounts.

The invention also encompasses a method of making the plasma nozzle of anyone of types described above wherein the method comprises arranging at least one gas injector opening upstream of at least one material injector opening and in a semi-circular area defined by 3 times a diameter of the at least one material injector opening and whose radius extends from a center axis of the at least one material injector opening.

The invention also encompasses a method of using the plasma nozzle of anyone of types described above wherein the method comprises introducing, while powder is being introduced via the at least one material injector opening, an intern gas through at least one gas injector opening located upstream of at least one material injector opening and in a semi-circular area defined by 3 times a diameter of the at least one material injector opening and whose radius extends from a center axis of the at least one material injector opening.

Embodiments of the invention also encompass an anode and/or a nozzle having an anode which prevents the material build-up in the anode in the vicinity of the material injection port and downstream from it. This is accomplished by injecting small amounts of gas compared to the total gas flow of the plasma jet in the vicinity of the material injection and downstream from it. The area of injection may reach from close to the injection point upstream to the anode exit. This forms a thin layer of gas that flows along the anode wall and which prevents material from depositing inside the anode.

Embodiments of the invention encompass an anode and/or a nozzle having an anode where the shroud of gas produced in the anode works like a shield and protects the anode wall from the injected material. As a consequence, this configuration prevents the build-up of the feedstock material on the anode wall. This leads to an increase of the lifetime of the anode, extending the operation time and allows longer continuous operation of the spray process without interruptions and deviation in the coating quality.

The novel design can be used in thermal spray processes, such as LPPS, VPS, PS-PVD, SPS and SPPS. The location of the different shroud gas inlets inside the anode, in particular, located upstream of the powder injection port is advantageous and not used in conventional systems.

The invention would not seem intuitive to those using conventional systems given the common expectation that such a configuration would be that the produced shroud gas limits the particle flow from the powder port going towards the hot gas or plasma, thereby reducing the efficiency to melt or evaporate the injected feedstock material. Secondly, with the injected shroud gas being at room temperature while the plasma jet is at temperatures up to 20,000 K could disadvantageously generate turbulences inside the nozzle or anode, which could deflect the particle flow from the axial direction.

However, experimental observations have shown that with a conventional anode, the coating build-up starts as a re-condensation and/or the formation of liquid phase around the powder port. This is due to the fact that the feedstock material as powder has a certain size distribution and is injected into a mixture of hot plasma gases, such as the plasma jet, and cold gas from the carrier gas of the powder port. The cold walls of the anode, turbulences and strong temperature gradients at the powder port allow the build-up of coating material around the powder port. However, when one places at least one inlet for supplying shroud gas in the anode of the invention at a proximity, in particular, upstream of the powder port, this will limit this build-up on the anode wall around the powder port by producing a thin film of gas where the feedstock material cannot deposit. The type and amount of the gas flow of the shroud gas and the precise location upstream can be controlled to allow limiting the negative effect of the introduction of a cold gas upstream of the powder port as described before, but at the same time will decrease the chance of feedstock material build-up upstream of the powder port. Additional configurations of shroud gas injections around the powder port radially, and downstream can be employed to completely stop the formation of material build-up during a longer operation of the spray system.

Experimental data and numerical simulations have also shown that using the shroud gas in the manner of the invention can function to direct and concentrate the powder particles toward the center of the hot gas or plasma jet and into the hottest zone and that the injected shroud gas thus forms a thin film of cold gas along the anode wall. In particular, the injection of shroud gas upstream of the powder port can function to prevent re-condensation and/or liquid formation upstream of the powder port. This optimum configuration is attributed to the different flow velocities existing inside the nozzle coming from the injected shroud gas, the injected carrier gas, powder particles and mix of these colder gases along with a hotter gas flow produced by the plasma gas.

The gas inlets of the shroud generating gas flow of the invention can be arranged in the section of the anode where the powder injection is located. The powder material can be injected from one or several powder ports. The possible and optimum zones where the shroud gas inlet should be positioned can be upstream from the powder port as well as downstream between the powder port towards the anode exit. The total gas flow through the one or several shroud gas inlets can be between 50% and 150% of the total carrier gas flow that is injected through the powder ports. The injected shroud gas can be any inert gas, in particular, argon or helium, but could be also a diatomic gas such as nitrogen. The shroud gas may be the same or different from the carrier gas that is used to inject the powder particles. The diameter or size of the shroud gas inlets can be between 20% and 120%, in particular 20% to 80%, preferably 20% to 50%, compared to the powder port diameter or size.

The powder injection port arranged in the nozzle/anode wall (as well as the gas injector ports I) can be either circular or non-circular shaped such as oval or elliptical (e.g., oblique ellipse) with the elongate ends oriented in a direction that is upstream/downstream. In such cases, one can define the same by either an average diameter or by a size of the opening. Alternatively, one can define such openings as having a diameter that is defined as the larger distance of the opening. Alternatively, one can define the opening by its open area can used this as its size. In addition to circular, oval or elliptical shapes for the ports can have other shapes such as generally rectangular, square, triangular, etc.

In all arrangements, there should be at least one shroud gas inlet that can be located upstream from the powder port. There should be at least one upstream inlet located in an area whose radius is a maximum 3 times the powder port diameter or size around the powder port. Additional shroud gas inlets may be placed upstream in the area of maximum 3 times the powder port diameter or size in length with respect to the powder port over the full circumference. Downstream of the powder port, they may be located at any distance between the powder port and the anode exit over the full circumference. The diameter of the shroud gas inlets may vary by 100% when one compares the smallest and biggest diameter. The area in which at least one gas inlet is placed can be characterized as an area A or first area. The area in which additional inlets can be placed in different arrangements and in an undefined number can be characterized as an area B or second area. Typically, a powder port diameter or size in vacuum type systems is between 0.5 and 5 mm, in particular, 1 to 3 mm. Practical examples have demonstrated that a shroud gas inlet diameter of between 0.5 and 1.5 mm, preferably 0.75 and 1 mm, can provide best results. Similar to the powder injection port, the injection of the shroud gas, can have different directions with respect to the flow of the primary process gas axially and radially inducing some swirl effect to follow or counter the flow and/or swirl flow of the primary process gas flow.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the figures.

DETAILED DESCRIPTION OF THE INVENTION

Figure 1:
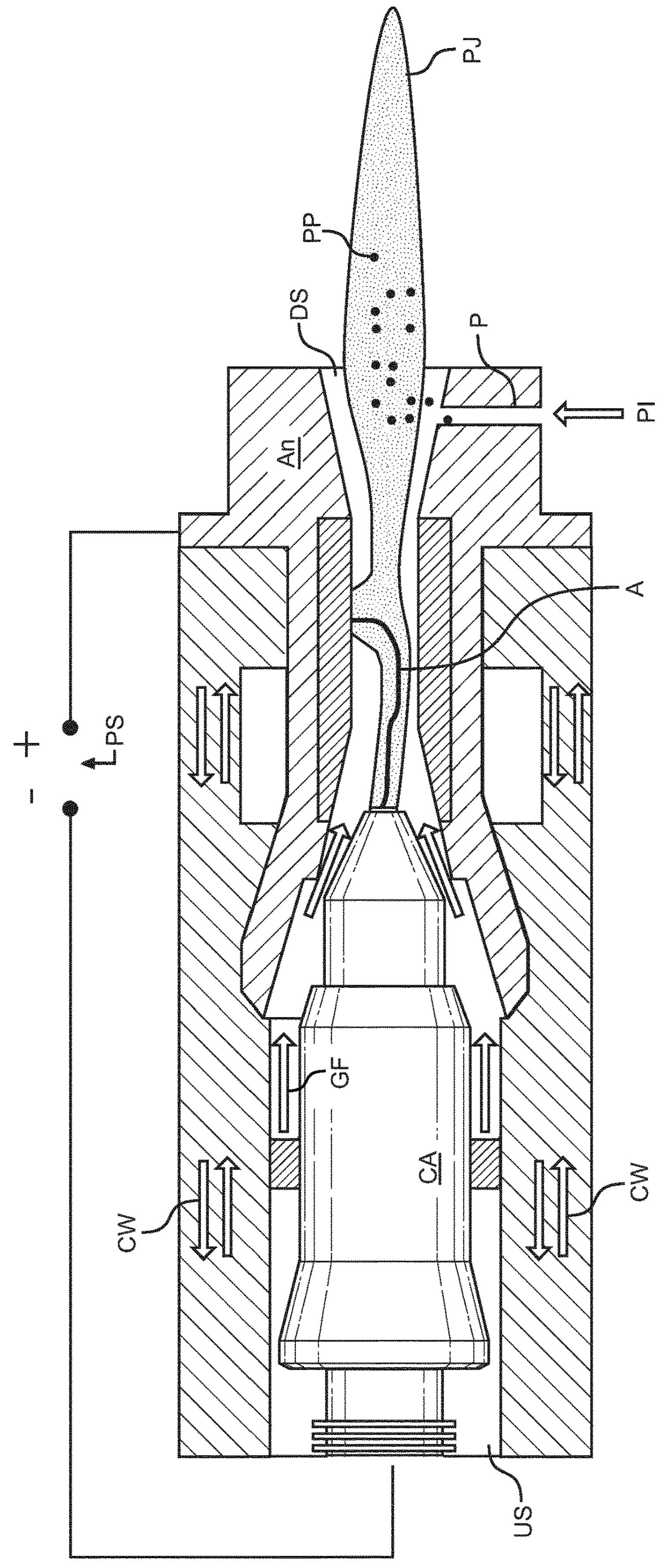
FIG. 1 PRIOR ART
FIG. 1 shows a prior art VPS F4 spray gun employing internal injection of powder material inside the anode.
Figure 2:
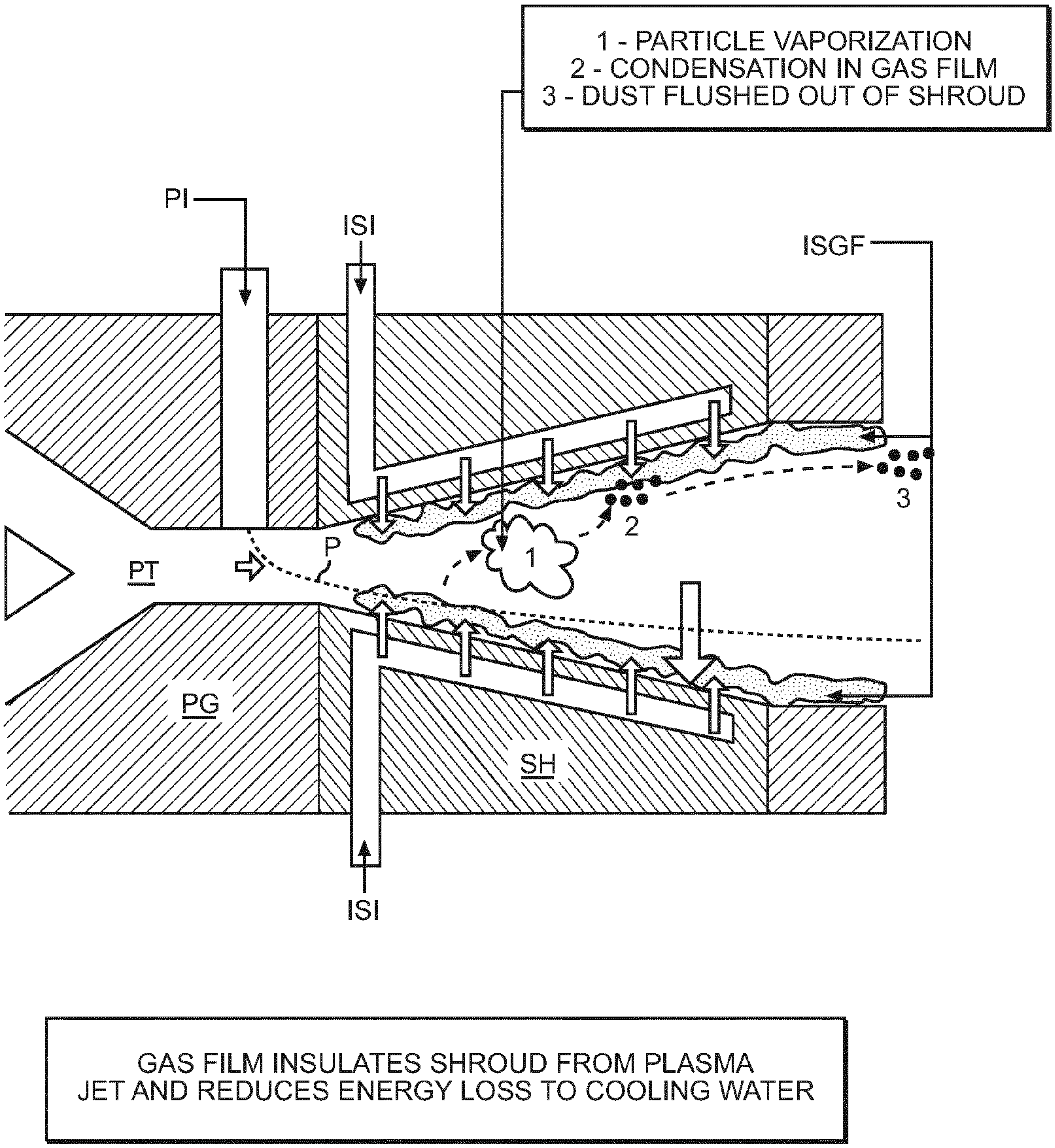
FIG. 2 PRIOR ART
FIG. 2 shows a prior art arrangement that employs an internal shroud gas film.

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure and are not limiting of the present disclosure nor are they necessarily drawn to scale.

The novel features which are characteristic of the disclosure, both as to structure and method of operation thereof, together with further aims and advantages thereof, will be understood from the following description, considered in connection with the accompanying drawings, in which an embodiment of the disclosure is illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms “a,” “an,” and “the” include the plural reference unless the context clearly dictates otherwise. For example, reference to “a powder material” would also mean that mixtures of one or more powder materials can be present unless specifically excluded. As used herein, the indefinite article “a” indicates one as well as more than one and does not necessarily limit its referent noun to the singular.

Except where otherwise indicated, all numbers expressing quantities used in the specification and claims are to be understood as being modified in all examples by the term “about.” Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms “about” and “approximately” indicate that the amount or value in question may be the specific value designated or some other value in its neighborhood. Generally, the terms “about” and “approximately” denoting a certain value is intended to denote a range within ±5% of the value. As one example, the phrase “about 100” denotes a range of 100±5, i.e. the range from 95 to 105. Generally, when the terms “about” and “approximately” are used, it can be expected that similar results or effects according to the disclosure can be obtained within a range of ±5% of the indicated value.

As used herein, the term “and/or” indicates that either all or only one of the elements of said group may be present. For example, “A and/or B” shall mean “only A, or only B, or both A and B”. In the case of “only A”, the term also covers the possibility that B is absent, i.e. “only A, but not B”.

The term “at least partially” is intended to denote that the following property is fulfilled to a certain extent or completely.

The terms “substantially” and “essentially” are used to denote that the following feature, property or parameter is either completely (entirely) realized or satisfied or to a major degree that does not adversely affect the intended result.

The term “comprising” as used herein is intended to be non-exclusive and open-ended. Thus, for example a composition comprising a compound A may include other compounds besides A. However, the term “comprising” also covers the more restrictive meanings of “consisting essentially of” and “consisting of”, so that for example “a composition comprising a compound A” may also (essentially) consist of the compound A.

The various embodiments disclosed herein can be used separately and in various combinations unless specifically stated to the contrary.

The invention will now be described with reference to FIG. 3 which show a cross-section of a section of anode An having a powder inlet or injection port P having a diameter “d” located in a wall W of the anode An. The port P can extend through the wall W in a manner similar to that shown in FIG. 1. The semi-circular area labeled with the letter A shows an area where one can place one or more shroud gas inlets which will be located in proximity to the port P. The area A around the powder port P is located upstream of the port P and is defined by a diameter that is 3 times the diameter “d” of the port P. A second larger area B may also include additional optional gas inlets and extends from an upstream location “x” to a downstream location “y”. For example, in an LPPS and PS-PVD type system, a common powder port P diameter “d” is 3 mm. Therefore, in such an application, at least one gas inlet (not shown) should be placed upstream in the area A which is defined by a semi-circle having a diameter of 9 mm. Upstream from the powder port P, one can place additional gas inlets within the 9 mm area A and can also place one or more additional gas inlets either upstream or downstream from the port P and outside the half-circle area A, i.e., in area B.

Figure 3:
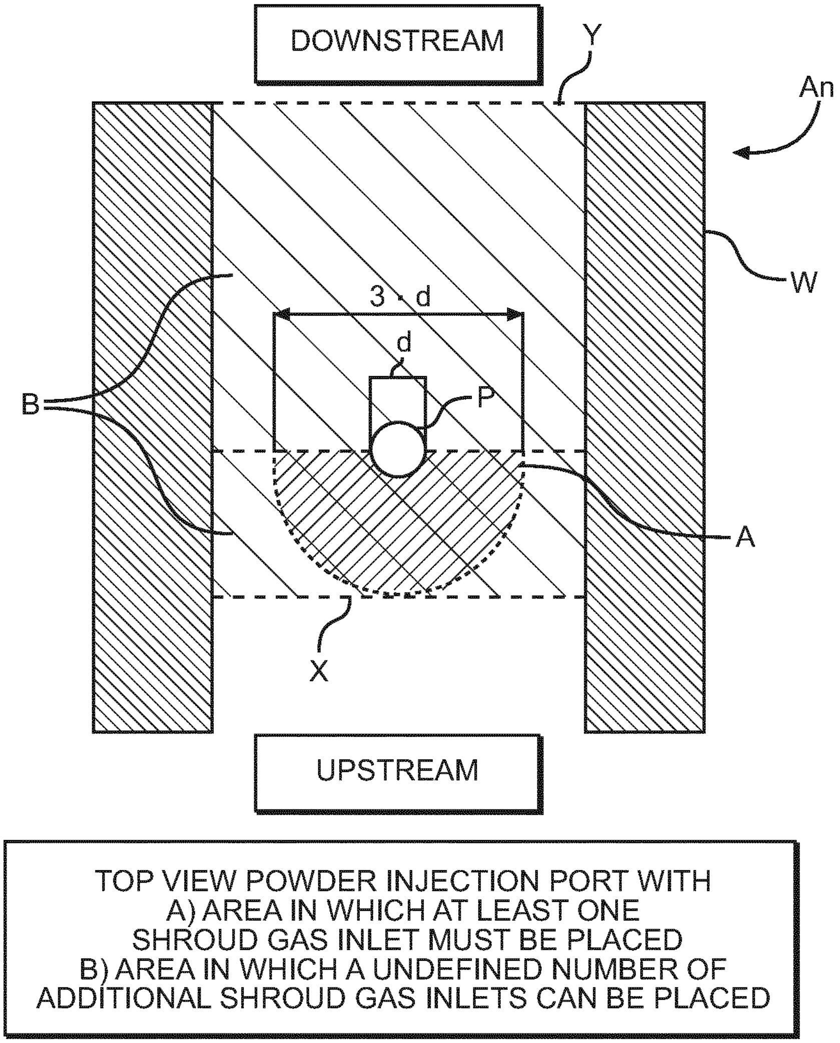
FIG. 3 shows a cross-section of a section of an anode which can be used to practice the invention and illustrates various locations and area sizes.
Figures 4A, 4B:
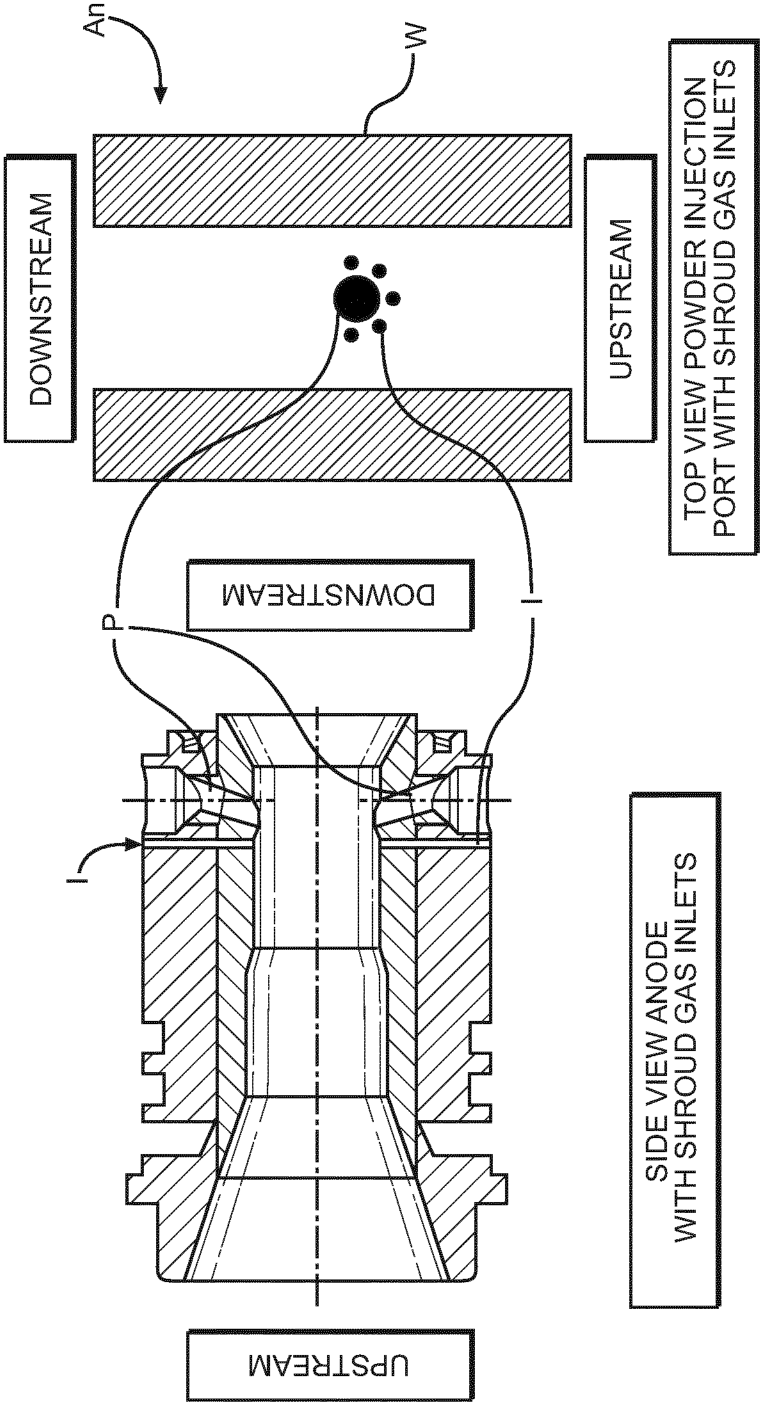
FIGS. 4A and 4B show cross-sections of a section of anode in accordance with one non-limiting embodiment of the invention. The cross-section of FIG. 4B is schematic and taken orthogonal relative to the cross-section of FIG. 4A.

FIGS. 4A and 4B show two orthogonal cross-sections of an embodiment of an anode An which includes 5 gas inlets I in area A of FIG. 3, at equal distance from the powder port P and in close proximity of the powder port P. With such an arrangement, the carrier gas material build-up around the powder port P is avoided. With such an arrangement, the total shroud gas flow through all gas inlet bores I can be varied from 50% to 150% with respect to the carrier gas flow through the anode An. Preferably, gas flows is provided through the inlets I in a flow that is below 100% of the carrier gas flow. Moreover, in case the spraying conditions are those used in LPPS in which the material vaporizes, one should be mindful that shroud gas flows which are too high can lead to undesirable re-condensation. The flow of carrier gas and shroud gas can be 10% to 30% compared to the gas flows used to create the plasma gas jet. The carrier gas flow can also be split in several powder port injectors or ports P, as well as the shroud gas inlets I. Typically, total carrier gas flows can be between 5 and 60 NLPM (Normal Liter Per Minute). They can also be between 20 and 50 NLPM, and are preferably between 25 and 40 NLPM. On the other hand, the shroud gas flow through the inlets I can be set between 5 and 80 NLPM, typically between 20 and 75 NLPM, and preferably between 25 and 40 NLPM.

Figure 5B:
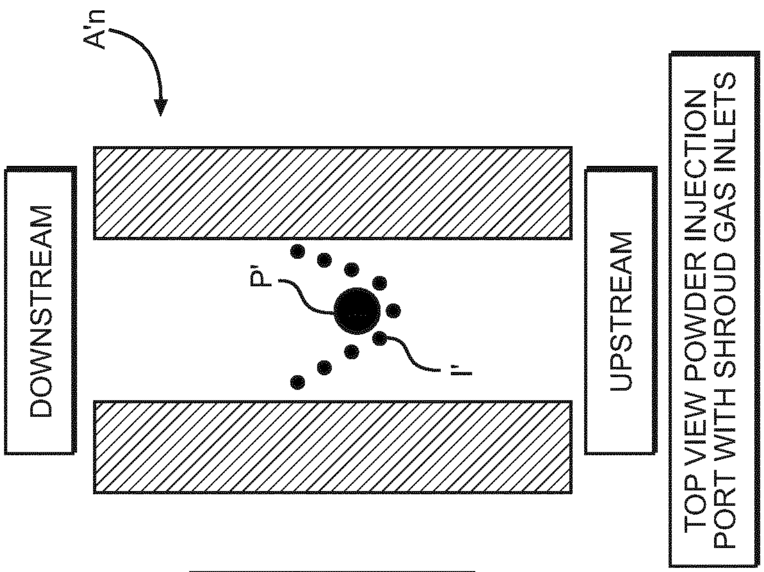
FIGS. 5A and 5B show cross-sections of a section of anode in accordance with another non-limiting embodiment of the invention. The cross-section of FIG. 5B is schematic and taken orthogonal relative to the cross-section of FIG. 5A.
Figure 5A:
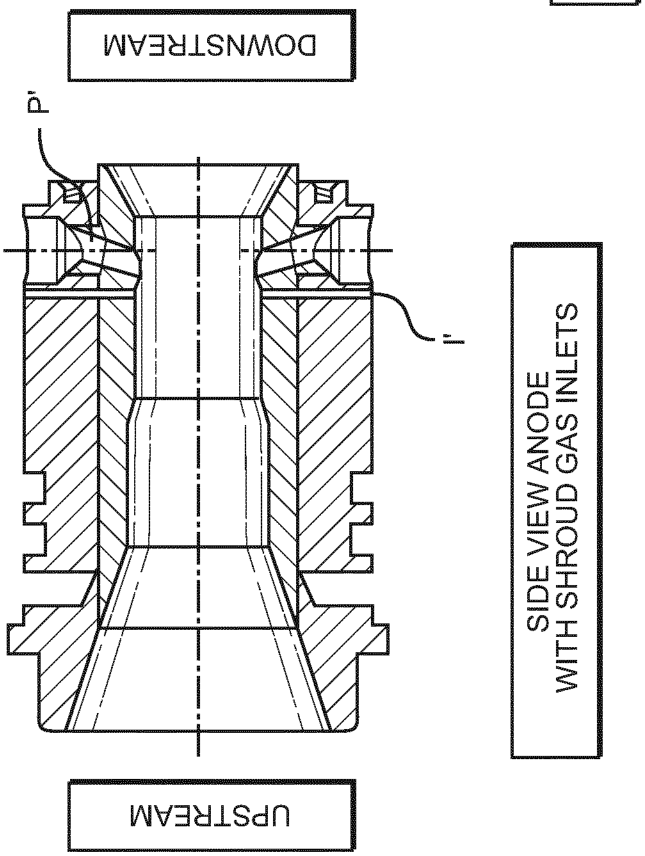

FIGS. 5A and 5B show another embodiment of an anode A'n having one or more powder injection ports P' and plural gas inlets I'. In this case the gas inlets I' are located in area A of FIG. 3 at varying distance from the powder port P'. Downstream of the port P' there are arranged additional gas inlets I' and are placed at a further azimuthal angle with respect to the powder port P' with some inlets I' located in area B of FIG. 3. This embodiment is designed to generate a gas shroud that follows the diffusion of the injected carrier gas. In addition to forming a protective gas shroud between the anode wall and the material/plasma jet, this configuration also leads to deflecting the injected powder material towards an anode axis into the zone of the highest plasma temperatures. Numerical simulations indicate that this will improve heat transfer from the hot plasma jet to the powder particles, which leads to a higher efficiency with respect to the material deposit versus the amount of injected material. Especially in cases of PS-PVD spraying, in which the powder material is transferred into the vapor phase, a larger share of the powder material will be vaporized compared to the classic anode design which lacks the shroud gas inlets. As with the previous embodiment, the inlets I' in area A function to prevent material build-up in a most critical zone around the powder injection port P'. However, in this embodiment, the inlets I' located in area B function to prevent material build-up in the anode wall.

Figure 6B:
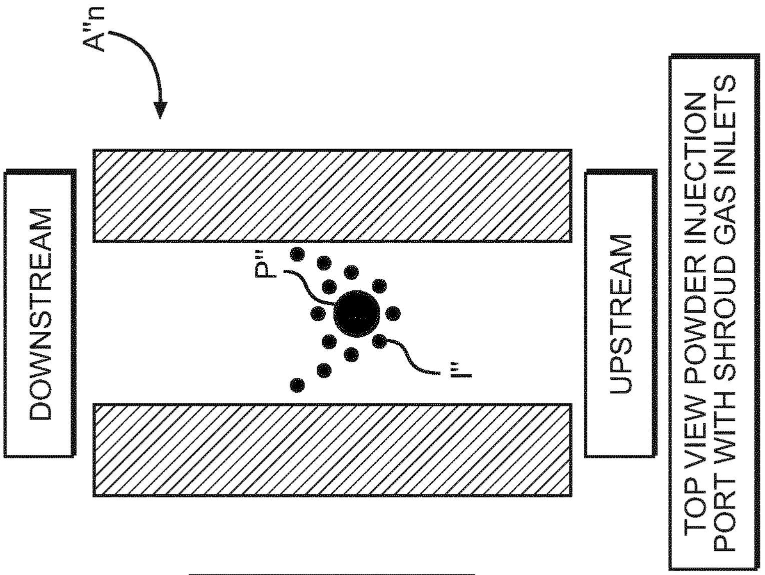
FIGS. 6A and 6B show cross-sections of a section of anode in accordance with another non-limiting embodiment of the invention. The cross-section of FIG. 6B is schematic and taken orthogonal relative to the cross-section of FIG. 6A.
Figure 6A:
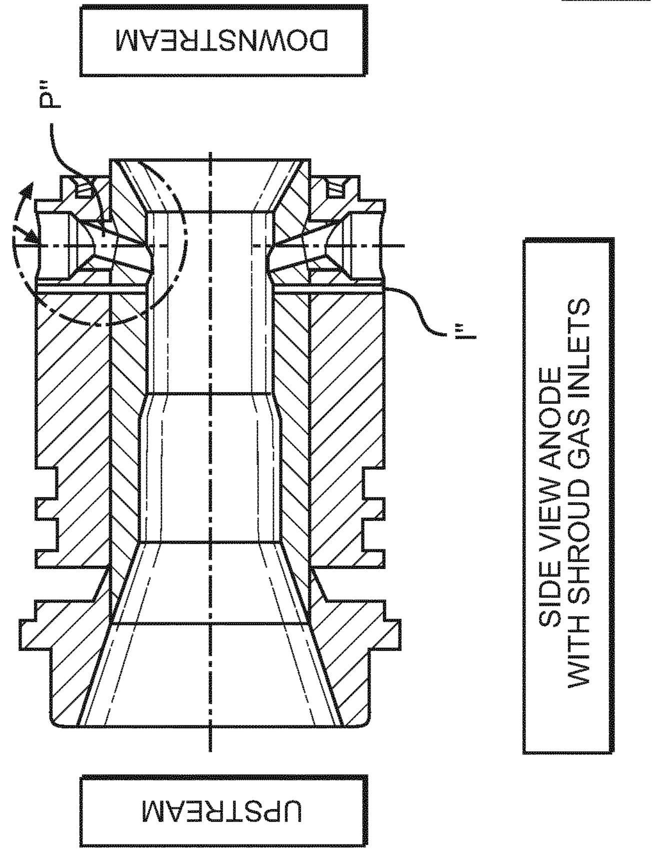

FIGS. 6A and 6B show another embodiment of an anode A"n having one or more powder injection ports P" and plural gas inlets I". In this case some gas inlets I" are located in area A of FIG. 3 at varying distance from the powder port P". Downstream of the port P" there are arranged additional gas inlets I" and these are placed at a further azimuthal angle with respect to the powder port P" with some inlets I" located in area B of FIG. 3. In addition, one or more gas inlets I" are located in area B between the inlets I" arranged in azimuthal angle with respect to the powder port P" and these form a generally circular group of gas inlets I" which surround the powder port P". This embodiment is also designed to generate a gas shroud that follows the diffusion of the injected carrier gas. In addition to forming a protective gas shroud between the anode wall and the material/plasma jet, this configuration also leads to deflecting the injected powder material towards an anode axis into the zone of the highest plasma temperatures. It is believed that this arrangement can improve heat transfer from the hot plasma jet to the powder particles, which can lead to a higher efficiency with respect to the material deposit versus the amount of injected material. Especially in cases of PS-PVD spraying, in which the powder material is transferred into the vapor phase, a larger share of the powder material will be vaporized compared to the classic anode design which lacks the shroud gas inlets. As with the previous embodiment, the inlets I" in area A function to prevent material build-up in a most critical zone around the powder injection port P". However, in this embodiment, the inlets I' located in area B are believed to function to prevent material build-up in the anode wall.

Figure 7B:
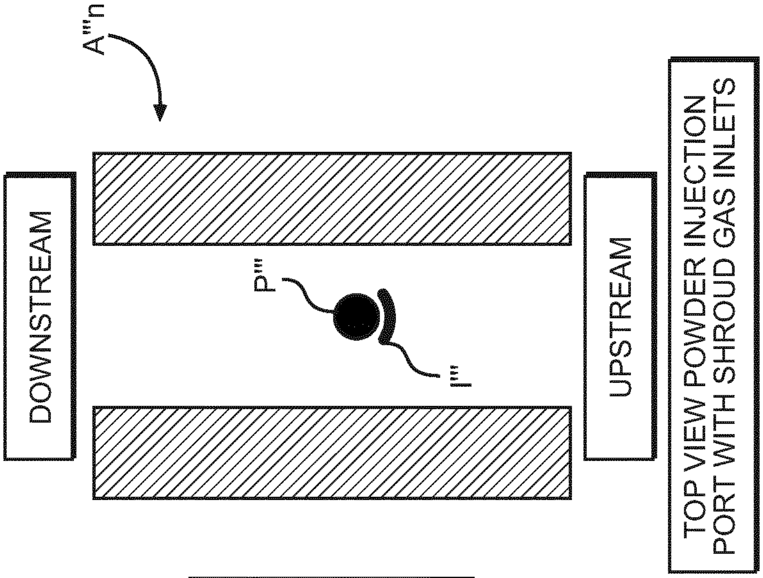
FIGS. 7A and 7B show cross-sections of a section of anode in accordance with another non-limiting embodiment of the invention. The cross-section of FIG. 7B is schematic and taken orthogonal relative to the cross-section of FIG. 7A.
Figure 7A:
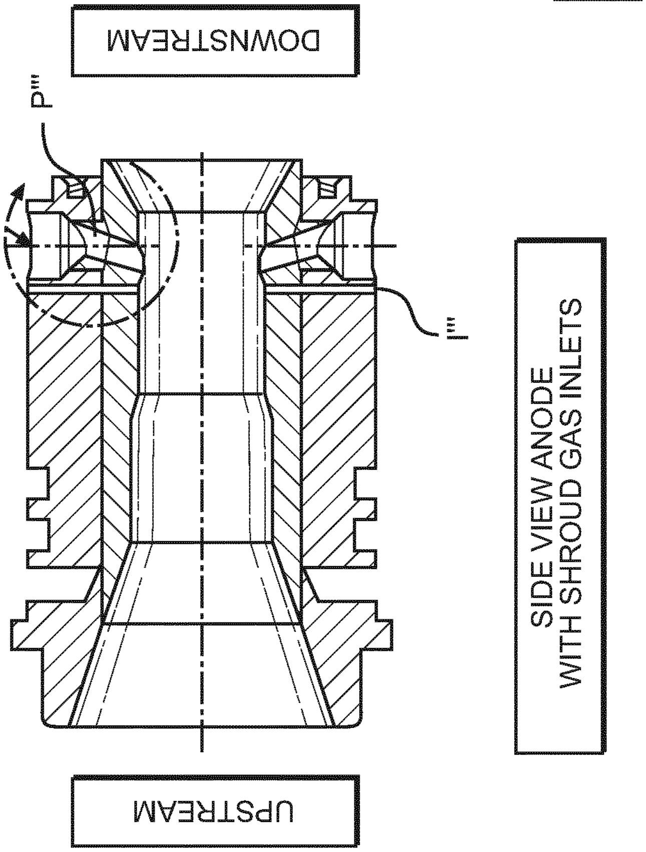

FIGS. 7A and 7B show another embodiment of an anode A" 'n having one or more powder injection ports P' and a single arc-shaped gas inlet I'. In this case the arc-shaped gas inlet I''' is located in area A of FIG. 3 with end portions being located a varying distance from the powder port P'''. Downstream of the port P' one could arrange additional gas inlets I''' (not shown in FIG. 7) in a manner similar to previous embodiments. This embodiment can also be designed to generate a gas shroud that follows the diffusion of the injected carrier gas. In addition to forming a protective gas shroud between the anode wall and the material/plasma jet, this configuration also leads to deflecting the injected powder material towards an anode axis into the zone of the highest plasma temperatures. It is believed that this arrangement can improve heat transfer from the hot plasma jet to the powder particles, which can lead to a higher efficiency with respect to the material deposit versus the amount of injected material. Especially in cases of PS-PVD spraying, in which the powder material is transferred into the vapor phase, a larger share of the powder material will be vaporized compared to the classic anode design which lacks the shroud gas inlets. As with the previous embodiment, the elongate arc-shaped inlet I''' in area A functions to prevent material build-up in a most critical zone around the powder injection port P'''.

Figure 8:
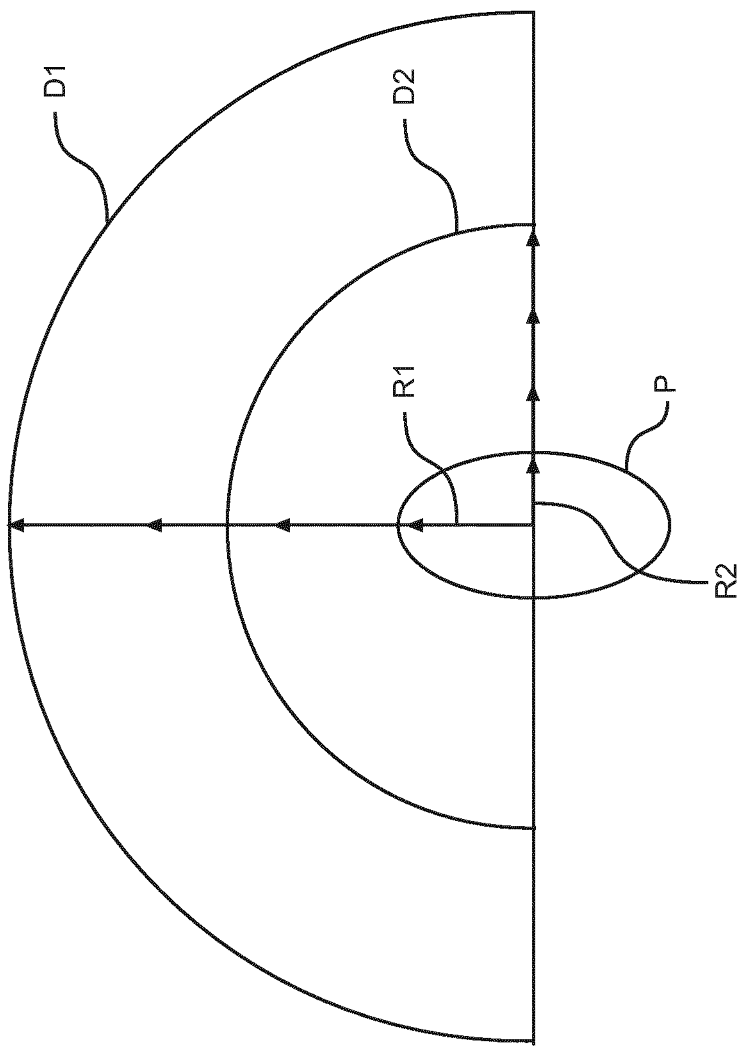
FIG. 8 shows an exemplary powder port with arc-shaped areas defined by different diameters of an oblique ellipse shaped powder injector opening.

The powder injection port P, P', P" or P''' as well as the gas injector ports or inlets I, I', I" and I''' can be either circular or non-circular shaped such as oval or elliptical (e.g., oblique ellipse) with the elongate ends oriented in a direction that is upstream/downstream. FIG. 8 shows an example of an oblique ellipse shaped powder port P. In such cases, one can define the port P by either an average diameter or by a size of the opening. Alternatively, one can define such openings as having a diameter that is defined as the larger distance (based on using the major axis) of the opening, i.e., the larger vertical arrow R1 in FIG. 8. When defining area A, one can use the vertical arrow R1 to determine the 3 times distance D1 of the same for area A (which represents an area covered by the larger semi-circle in FIG. 8) or one can use the horizontal arrow R2 (based on using the minor axis) to determine the 3 times distance D2 of the same for area A (which represents an area covered by the smaller semi-circle in FIG. 8). The invention contemplates using either option in the case of such non-circular openings or ports P. Alternatively, one can define the opening or port P by its open area and this can used this as its size. In addition to circular, oval or elliptical shapes for the ports can have other shapes such as generally rectangular, square, triangular, etc.

The gas inlets I, I', I" and I''' of the shroud generating gas flow of the invention can be arranged in the section of the anode An, A'n, A"n and A' "n where the powder injection port P, P', P" and P''' is located. The powder material can be injected from one or several powder ports. The possible and optimum zones where the shroud gas inlet(s) should be positioned can be upstream from the powder port as well as downstream between the powder port and towards the anode exit. The total gas flow through the one or several shroud gas inlets can be between 50% and 150% of the total carrier gas flow that is injected through the powder ports. The injected shroud gas can be any inert gas, in particular, argon or helium, but could be also a diatomic gas such as nitrogen. The shroud gas may be the same or different from the carrier gas that is used to inject the powder particles. The diameter of each shroud gas inlet I, I', I" and I''' can be between 20% and 120%, in particular 20% to 80%, preferably 20% to 50%, compared to the diameter of powder port P, P', P" and P'''.

In all arrangements, there should be at least one shroud gas inlet that can be located upstream from the powder port. There should be at least one upstream inlet located in an area whose radius is a maximum 3 times the powder port diameter or size around the powder port P, P', P" or P'''. Additional shroud gas inlets I, I', I" or I''' may be placed upstream in the area of maximum 3 times the powder port diameter or size in length with respect to the powder port P over the full circumference. Downstream of the powder port, they may be located at any distance between the powder port P, P', P" or P''' and the anode exit over the full circumference. The diameter or size of the shroud gas inlets I, I', I" or I''' may vary by 100% when one compares the smallest and biggest diameter. The area in which at least one gas inlet is placed can be characterized as an area A or first area (see FIG. 3). The area in which additional inlets can be placed in different arrangements and in an undefined number can be characterized as an area B or second area (see FIG. 3). Typically, a powder port diameter of the powder port in vacuum type systems is between 0.5 and 5 mm, in particular, between 1 to 3 mm. Practical examples have demonstrated that a shroud gas inlet I, I', I" or I''' diameter of the gas inlets I of between 0.5 and 1.5 mm, preferably between 0.75 and 1 mm, can provide best results. Similar to the powder injection port P, P', P" or P''', the injection of the shroud gas via inlets I, I', I" or I''', can have different directions with respect to the flow of the primary process gas axially and radially inducing some swirl effect to follow or counter the flow and/or swirl flow of the primary process gas flow.

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A plasma nozzle comprising:

a nozzle body arranged to engage with a thermal spray gun;

the nozzle body comprising:

an axial through bore having up-stream input orifice and a down-stream nozzle exit;

at least one material injector positioned between the up-stream input orifice and the nozzle-exit, said at least one material injector being configured to introduce a feedstock material into a gas flow passing through the axial through bore; and at least one gas injector configured to introduce a shroud gas flow into the axial through bore and being located at a position up-stream of said at least one material injector, wherein the at least one gas injector is a first opening in a wall of the nozzle body and the at least one material injector is a second opening in the wall of the nozzle body, and wherein the first opening is arranged in a semi-circular or arc-shaped area defined by 3 times a diameter or average diameter of the second opening and whose radius extends parallel to a center axis of the axial through bore from a center axis of the second opening.

2. The plasma nozzle of claim 1, wherein the at least one gas injector is an opening in a wall of the nozzle body having a diameter or size that is less than a diameter or size of said at least one material injector.

3. The plasma nozzle of claim 1, wherein the first opening comprises plural openings spaced from the center axis of the second opening by a same amount.

4. The plasma nozzle of claim 1, wherein the first opening comprises plural openings spaced from the center axis of the second opening by different amounts.

5. The plasma nozzle of claim 1, wherein the second opening comprises plural openings.

6. The plasma nozzle of claim 1, further comprising plural down-stream gas injectors positioned at an azimuthal angle with respect to the at least one material injector.

7. The plasma nozzle of claim 1, wherein the nozzle body is an anode.

8. The plasma nozzle of claim 1, wherein the nozzle body is an anode of a thermal spray gun.

9. A thermal spray gun comprising a plasma nozzle of claim 1.

10. The plasma nozzle of claim 1, wherein the at least one gas injector is a circular opening in a wall of the nozzle body and the at least one material injector is a circular opening in the wall of the nozzle body.

11. The plasma nozzle of claim 1, wherein the at least one gas injector is a non-circular opening in a wall of the nozzle body and the at least one material injector is a circular opening in the wall of the nozzle body.

12. The plasma nozzle of claim 1, wherein the at least one gas injector is a circular opening in a wall of the nozzle body and the at least one material injector is a non-circular opening in the wall of the nozzle body.

13. The plasma nozzle of claim 1, wherein the at least one gas injector is a non-circular opening in a wall of the nozzle body and the at least one material injector is a non-circular opening in the wall of the nozzle body.

14. A thermal spray gun plasma nozzle comprising:

an anode comprising:

an axial through bore having up-stream input orifice and a down-stream nozzle exit;

at least one material injector opening positioned between the up-stream input orifice and the nozzle-exit, said at least one material injector opening being configured to introduce a feedstock material into a gas flow passing through the axial through bore; and at least one gas injector opening configured to introduce a shroud gas flow into the axial through bore and being located at a position up-stream of said at least one material injector opening, wherein the at least one gas injector opening is smaller in diameter or size than the at least one material injector opening, and wherein the at least one gas injector is arranged in a semi-circular or arc-shaped area defined by 3 times a diameter or average diameter of the at least one material injector opening and whose radius extends parallel to a center axis of the axial through bore from a center axis of the at least one material injector opening.

15. The plasma nozzle of claim 14, wherein the at least one gas injector opening comprises plural openings spaced from the center axis of the at least one material injector opening.

16. The plasma nozzle of claim 14, wherein the at least one gas injector opening comprises plural openings spaced from the center axis of the at least one material injector opening by different amounts.

17. The plasma nozzle of claim 14, wherein the at least one material injector opening and the at least one gas injector opening are arranged in an internal wall of the axial through bore.

18. A thermal spray gun plasma nozzle comprising:

an anode comprising:

an axial through bore having up-stream input orifice and a down-stream nozzle exit;

at least one material injector opening positioned between the up-stream input orifice and the nozzle-exit, said at least one material injector opening being configured to introduce a powder feedstock material into a gas flow passing through the axial through bore; and at least one gas injector opening configured to introduce an inert shroud gas flow into the axial through bore and being located at a position up-stream of said at least one material injector opening, wherein the at least one gas injector opening is smaller in diameter or size than the at least one material injector opening, and wherein the at least one gas injector opening is arranged in a semi-circular area defined by 3 times a diameter or average diameter of the at least one material injector opening and whose radius extends parallel to a center axis of the axial through bore from a center axis of the at least one material injector opening.

19. The plasma nozzle of claim 18, wherein the at least one gas injector opening comprises plural openings spaced from the center axis of the at least one material injector opening.

20. The plasma nozzle of claim 18, wherein the at least one gas injector opening comprises plural openings spaced from the center axis of the at least one material injector opening by different amounts.

21. The plasma nozzle of claim 18, wherein the at least one material injector opening and the at least one gas injector opening are arranged in an internal wall of the axial through bore.

22. A method of making the plasma nozzle of claim 1, comprising:

arranging at least one gas injector opening upstream of at least one material injector opening and in a semi-circular or arc-shaped area defined by 3 times a diameter or average diameter of the at least one material injector opening and whose radius extends parallel to the axial through bore from a center axis of the at least one material injector opening.

23. A method of using the plasma nozzle of claim 1, comprising:

introducing, while powder is being introduced via the at least one material injector opening, an intern gas through at least one gas injector opening located upstream of at least one material injector opening and in a semi-circular or arc-shaped area defined by 3 times a diameter or average diameter of the at least one material injector opening and whose radius extends parallel to the axial through bore from a center axis of the at least one material injector opening.

* * * * *